United States Patent
Sakai et al.

(10) Patent No.: US 6,920,968 B2
(45) Date of Patent: *Jul. 26, 2005

(54) CLUTCH PLATE, FRICTION CLUTCH, AND COUPLING DEVICE

(75) Inventors: Toshifumi Sakai, Kariya (JP); Junji Ando, Kariya (JP); Akiyoshi Tashiro, Kariya (JP); Naoyuki Sakai, Kariya (JP); Toshiyuki Saito, Kariya (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/290,146

(22) Filed: Nov. 8, 2002

(65) Prior Publication Data

US 2003/0106759 A1 Jun. 12, 2003

(30) Foreign Application Priority Data

Dec. 25, 2001 (JP) ........................................ 2001-392475

(51) Int. Cl.$^7$ .......................... F16D 69/00; F16D 27/115
(52) U.S. Cl. .................. 192/35; 192/70.12; 192/70.14; 192/84.7; 192/84.91; 192/107 M; 192/113.36
(58) Field of Search ................ 192/35, 70.12, 192/70.14, 84.7, 84.91, 107 M, 113.36

(56) References Cited

U.S. PATENT DOCUMENTS

| | | | | | |
|---|---|---|---|---|---|
| 3,073,424 | A | * | 1/1963 | Russell .................. | 192/113.36 |
| 4,988,421 | A | | 1/1991 | Drawl et al. | |
| 5,198,285 | A | | 3/1993 | Arai et al. | |
| 5,205,188 | A | | 4/1993 | Repenning et al. | |
| 5,411,758 | A | * | 5/1995 | Simpson ........................ | 427/8 |
| 5,584,776 | A | | 12/1996 | Weilant et al. | |
| 5,651,430 | A | * | 7/1997 | Rancourt et al. ....... | 188/1.11 L |
| 6,006,869 | A | | 12/1999 | Rancourt et al. | |
| 6,077,607 | A | * | 6/2000 | Zornik ........................ | 428/408 |
| 6,136,386 | A | | 10/2000 | Nakahigashi et al. | |
| 6,158,561 | A | * | 12/2000 | Sakai et al. .................... | 192/35 |
| 6,358,565 | B1 | * | 3/2002 | Krenkel et al. ............. | 427/343 |
| 6,427,817 | B1 | * | 8/2002 | Arai et al. ..................... | 192/35 |
| 6,652,969 | B1 | | 11/2003 | Murakami et al. | |
| 6,719,115 | B2 | | 4/2004 | Rogner et al. | |
| 2003/0217904 | A1 | * | 11/2003 | Ando et al. ............. | 192/107 M |

FOREIGN PATENT DOCUMENTS

| | | |
|---|---|---|
| EP | 0 856 676 | 8/1998 |
| EP | 0 961 038 | 12/1999 |
| EP | 1 178 233 | 2/2002 |
| EP | 1 323 942 | 7/2003 |
| GB | 1 263 234 | 2/1972 |
| JP | 03-292385 A | 12/1991 |
| JP | 11-287258 A | 10/1999 |

OTHER PUBLICATIONS

D. Sheeja, et al., Wear 249, pp. 433–439, "Tribological Properties and Adhesive Strength of DLC Coatings Prepared Under Different Substrate Bias Voltages", 2001.

* cited by examiner

Primary Examiner—Richard M. Lorence
(74) Attorney, Agent, or Firm—Oblon, Spivak, McClelland, Maier & Neustadt, P.C.

(57) ABSTRACT

A friction clutch has a plurality of iron inner clutch plates and a plurality of iron outer clutch plates. Both the clutch plates have sliding surfaces which are friction-engaged each other. A thin carbon film in a diamond form, which functions as a solid lubricant, is formed on each of the sliding surfaces of the outer clutch plates by a known method such as the Chemical Vapor Deposition method. A known nitride treatment or quenching and tempering treatment is applied to the sliding surfaces of the inner clutch plates. A coupling device has a pilot clutch mechanism with the friction clutch and an electromagnetic actuator. As a result, the friction clutch is resistant to wear and the coupling device is excellent in durability.

11 Claims, 8 Drawing Sheets

CLUTCH PLATE, FRICTION CLUTCH, AND COUPLING DEVICE

BACKGROUND OF THE INVENTION

The present invention relates to a friction clutch used in, for example, a coupling device of a vehicle.

A typical friction clutch includes a drive clutch plate and a driven clutch plate which friction-engage with each other to transmit power.

Surface treatment is applied onto sliding surfaces of both clutch plates to retard wear by friction. The surface treatment includes, for example, nitride treatment, or quenching and tempering treatment. Wear of the sliding surfaces is reduced by reinforcing the sliding surfaces of both clutch plates by these surface treatments.

However, even in the case in which the surface treatment as describe above is applied, if both clutch plates are friction-engaged in the state without lubricant oil, or if a great power is transmitted even in the friction engagement with the lubricant oil, the sliding surfaces wear significantly, and the clutch plates have less durability.

BRIEF SUMMARY OF THE INVENTION

An object of the present invention is to provide a clutch plate that is resistant to wear and excellent in durability. Another object of the present invention is to provide a friction clutch and a coupling device that have such clutch plates.

To achieve the foregoing and other objectives and in accordance with the purpose of the present invention, an iron clutch plate having a sliding surface that contacts another clutch plate is provided. A thin carbon film in a diamond form is formed on the sliding surface.

In another perspective of the present invention, a friction clutch having a first clutch plate and a second clutch plate is provided. The first clutch plate has a first sliding surface. The second clutch plate has a second sliding surface that contacts the first sliding surface. The clutch plates friction-engage with each other to transmit torque. A thin carbon film in a diamond form is formed on at least one of the first and second sliding surfaces.

In yet another perspective of the present invention, a coupling device having a first rotary member, a second rotary member, a plurality of housing chambers, a first clutch, a second clutch, and an electromagnetic actuator is provided. The second rotary member is rotatable relative to the first rotary member. The housing chambers are defined between the first rotary member and the second rotary member. The housing chambers include a first housing chamber, which is charged with lubricant oil, and a second housing chamber, which is not charged with lubricant oil. The second housing chamber is sealed from the first housing chamber. The first clutch is housed in the second housing chamber. The first clutch includes a first iron clutch plate and a second iron clutch plate, which friction-engage with each other. The first clutch plate has a first sliding surface that contacts the second clutch plate. The second clutch plate has a second sliding surface that contacts the first clutch plate. A thin carbon film in a diamond form is formed on at least one of the first and second sliding surfaces. The second clutch is housed in the first housing chamber. The first and second clutches cooperate to transmit torque between the first rotary member and the second rotary member. The electromagnetic actuator actuates the first clutch such that the clutch plates friction-engage with each other.

In a further perspective of the present invention, a coupling device having a first rotary member, a second rotary member, a housing chamber, and a plurality of clutches, is provided. The second rotary member is rotatable relative to the first rotary member. The housing chamber is defined between the first rotary member and the second rotary member. The housing chamber is charged with lubricant oil. The clutches are located in the housing chamber. The clutches cooperate to transmit torque between the first rotary member and the second rotary member. At least one of the clutches is a friction clutch having a first iron clutch plate and a second clutch plate. The clutch plates friction-engage with each other. The first clutch plate has a first sliding surface that contacts the second clutch plate. The second clutch plate has a second sliding surface that contacts the first clutch plate. A thin carbon film in a diamond form is formed on at least one of the first and second sliding surfaces.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment according to the present invention will be explained below with reference to FIGS. 1 to 8.

Figure 2:
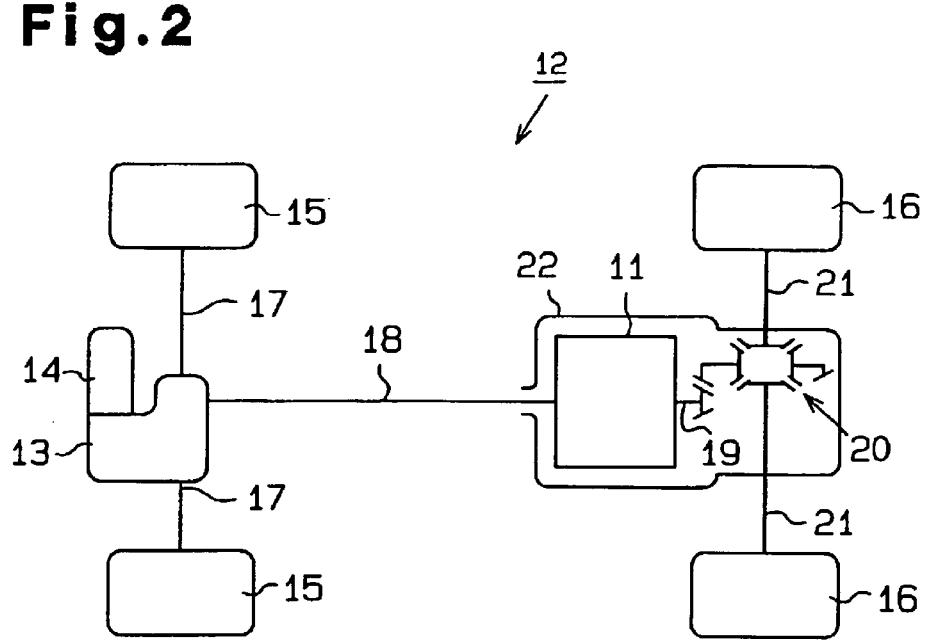
FIG. 2 is a view schematic diagram showing a four-wheel drive car loaded with the coupling device in FIG. 1.

As shown in FIG. 2, a four-wheel drive vehicle 12 includes a coupling device 11, a trans-axle 13, an engine 14, a pair of front wheels 15, and a pair of rear wheels 16. Power of the engine 14 is transmitted to the front wheels 15 via the trans-axle 13 and a pair of axle shafts 17.

The coupling device 11 is provided on a power transmission route between the engine 14 and the rear wheels 16. Namely, the coupling device 11 is connected to the trans-axle 13 via a propeller shaft 18. A rear differential 20 is connected to the coupling device 11 via a drive pinion shaft 19. The rear wheels 16 are connected to the rear differential 20 via a pair of axle shafts 21. The coupling device 11 selectively permits and shuts off the transmission of torque from the propeller shaft 18 to the drive pinion shaft 19.

The coupling device 11 and the rear differential 20 are housed in a differential carrier 22 and are supported by the carrier 22. The differential carrier 22 is supported by a vehicle body of the four-wheel drive vehicle 12.

Figure 1:
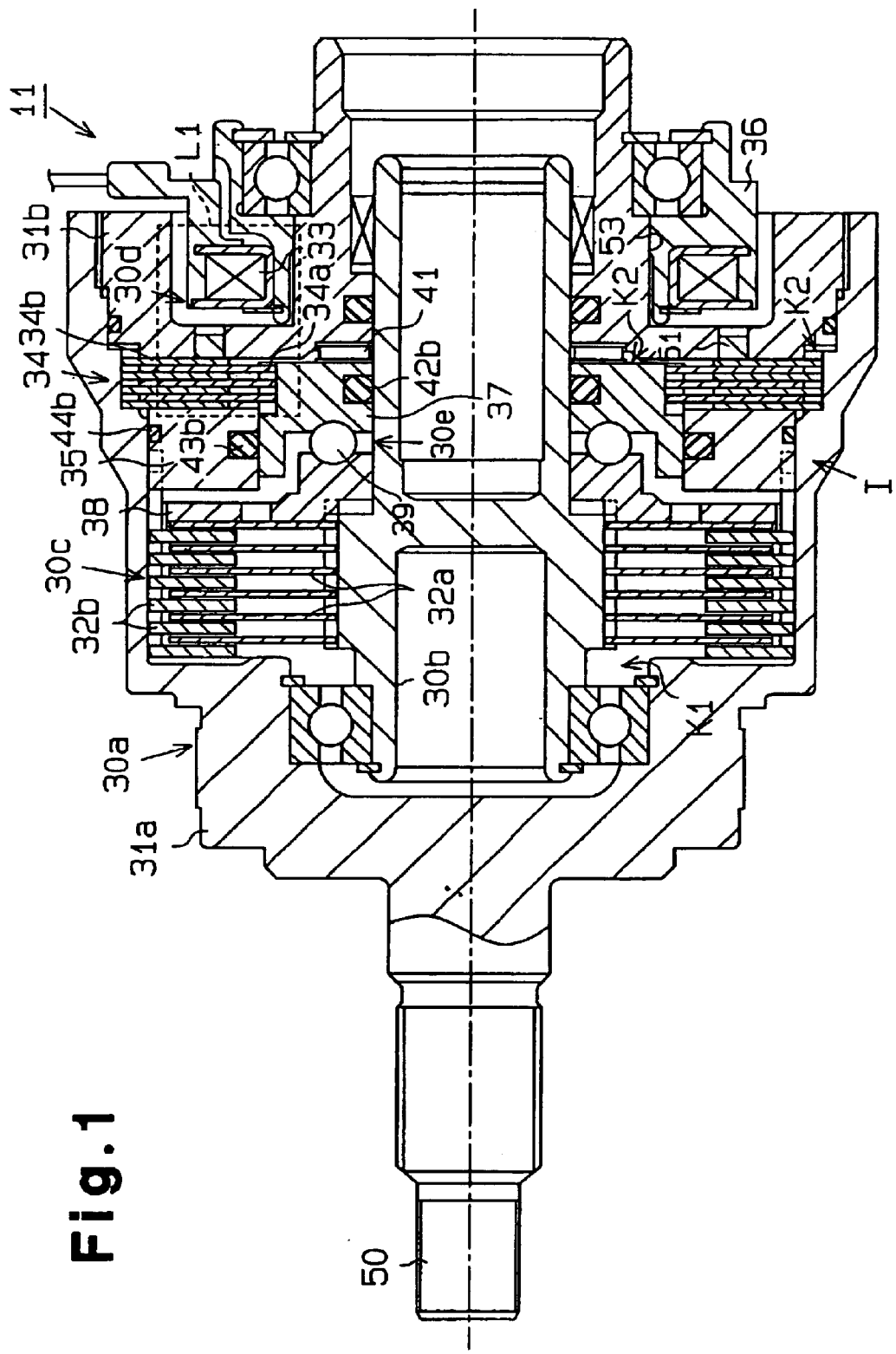
FIG. 1 is a cross-sectional view showing a coupling device according to a first embodiment of the present invention.

As shown in FIG. 1, the coupling device 11 includes a first rotary member, a second rotary member, a second clutch, a pilot clutch mechanism 30d, and a cam mechanism 30e. In this embodiment, the first rotary member is an outer case 30a, the second rotary member is an inner shaft 30b, and the second clutch is a main clutch mechanism 30c.

The outer case 30a (an external rotary member) includes a closed-end cylindrical front housing 31a and a rear housing 31b screwed into the front housing 31a so as to be placed over a rear end opening part of the front housing 31a. An input shaft 50 protrudes from a front end of the front housing 31a. The input shaft 50 is connected to the propeller shaft 18 (see FIG. 2).

The front housing 31a is formed of aluminum (a non-magnetic material), and the rear housing 31b is formed of iron (a magnetic material). A ring body 51 of stainless steel (a non-magnetic material) is embedded in a middle part of the rear housing 31b in the radial direction.

An outer circumference part of the front housing 31a in the vicinity of the front end is supported rotatably with respect to the differential carrier 22 (see FIG. 2) via a bearing (not shown). The rear housing 31b is supported rotatably with respect to a yoke 36, which is supported by the differential carrier 22 (see FIG. 2), via a bearing. A rear side cylindrical part of the rear housing 31b is supported rotatably with respect to the differential carrier 22 (see FIG. 2) via an oil seal (not shown).

The inner shaft 30b penetrates through a central part of the rear housing 31b to be inserted into the front housing 31a. A gap between the inner shaft 30b and the rear housing 31b is sealed. The inner shaft 30b is supported rotatably with respect to the front housing 31a and the rear housing 31b with its movement in the axial direction being restricted. A tip end portion of the drive pinion shaft 19 (see FIG. 2) is fitted into the inner shaft 30b. The drive pinion shaft 19 is not shown in FIG. 1.

As shown in FIG. 1, the main clutch mechanism 30c is a wet type clutch mechanism, and includes a plurality of iron inner clutch plates 32a and a plurality of iron outer clutch plates 32b. A wet type friction material with cellulosic fibers as a base material is stuck on both side surfaces (both sliding surfaces) of each of the inner clutch plates 32a. Consequently, when the adjacent inner clutch plate 32a and outer clutch plate 32b are engaged with each other, the materials of the plates 32a and 32b, namely, the iron materials are not directly in sliding contact with each other. Thus, particles caused by wear of iron hardly occur.

These clutch plates 32a and 32b are placed near a back wall of the front housing 31a. The inner clutch plates 32a are mounted to an outer circumference of the inner shaft 30b by spline fitting, and are movable in the axial direction with respect to the inner shaft 30b.

The outer clutch plates 32b are mounted to an inner circumference of the front housing 31a by spline fitting, and are movable in the axial direction with respect to the front housing 31a. The inner clutch plates 32a and the outer clutch plates 32b are alternately placed. The adjacent inner clutch plate 32a and outer clutch plate 32b are capable of moving closer to each other and away from each other in the axial direction.

The pilot clutch mechanism 30d includes an annular electromagnet 33, a first clutch, and an armature 35. In this embodiment, the first clutch is a friction clutch 34. The electromagnet 33 and armature 35 construct an electromagnetic actuator. The electromagnet 33 is fitted in the yoke 36. Part of the yoke 36 and the electromagnet 33 are housed in an annular recess 53 formed in the rear housing 31b.

The friction clutch 34 includes a plurality of first clutch plates and a plurality of second clutch plates. In this embodiment, the second clutch plates are iron inner clutch plates 34a, and the first clutch plates are iron outer clutch plates 34b. The inner clutch plates 34a are mounted to an outer circumference of a first cam member 37 constructing part of the cam mechanism 30e by spline fitting, and are movable in the axial direction with respect to the first cam member 37. Meanwhile, the outer clutch plates 34b are mounted to the inner circumference of the front housing 31a by spline fitting, and are movable in the axial direction with respect to the front housing 31a.

The inner clutch plates 34a and the outer clutch plates 34b are alternately placed. The adjacent inner clutch plate 34a and outer clutch plate 34b are able to move close to and away from each other in the axial direction.

Figure 3:
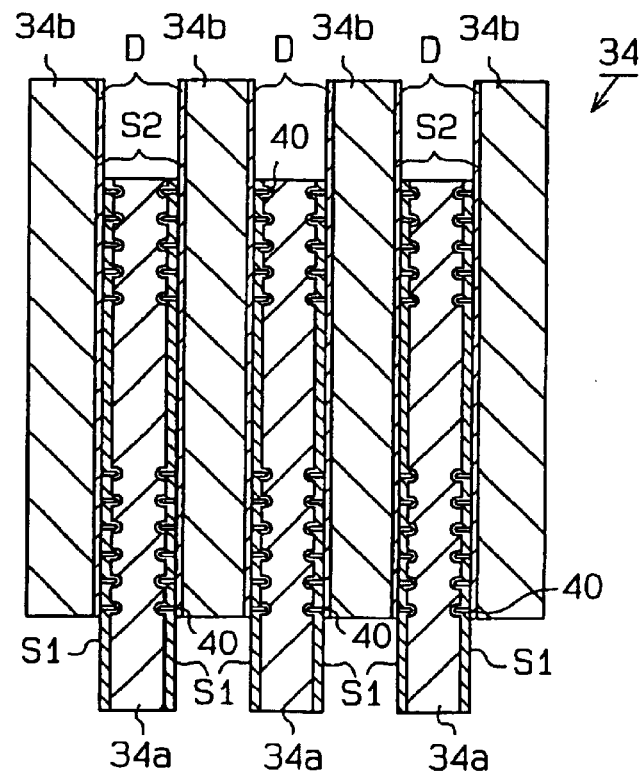
FIG. 3 is a cross-sectional view showing inner clutch plates and outer clutch plates included in the coupling device in FIG. 1.

As shown in FIG. 3, each inner clutch plate 34a has a pair of sliding surfaces S1 opposing two of the outer clutch plates 34b placed at both sides of the plate 34a. Each of the two outer clutch plates 34b located at the outermost side has one sliding surface S2 corresponding to the adjacent inner clutch plate 34a. Each of the other outer clutch plates 34b has a pair of sliding surfaces S2 opposing two of the inner clutch plates 34a placed at both sides of the plate 34b.

Figure 4:
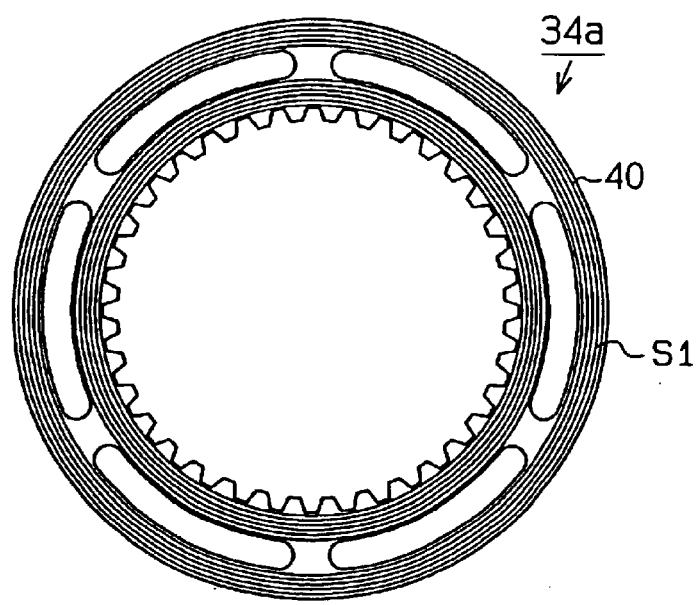
FIG. 4 is a front view showing one of the inner clutch plates in FIG. 3.

As shown in FIG. 3 and FIG. 4, a number of annular grooves 40 having very small width are formed with a very small pitch on each of the sliding surfaces S1 by press working. Known nitride treatment, or known quenching and tempering treatment is applied to each of the sliding surfaces S1. Though these annular grooves 40 are illustrated to be larger than as they are for purposes of illustration, the actual pitch and height of the groove 40 is only several $\mu$m.

As shown in FIG. 3, a thin carbon film D in a diamond form is formed on each of the sliding surfaces S2 by a known method such as the CVD (Chemical Vapor Deposition) method, the PVD (Physical Vapor Deposition) method, and the ion vapor deposition method.

Figure 8:
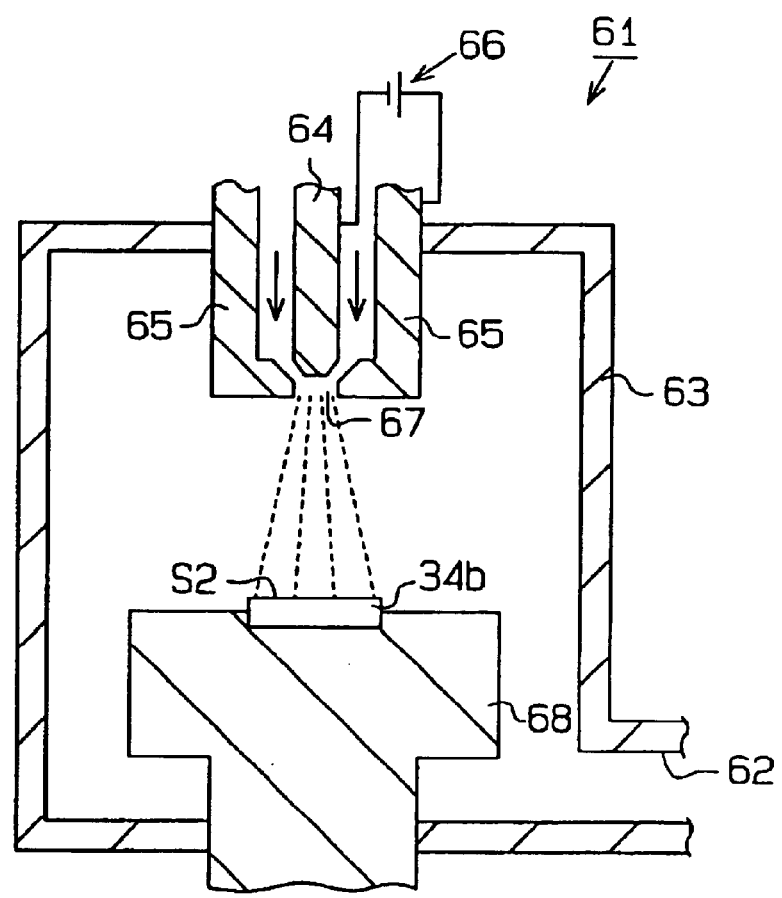
FIG. 8 is a diagrammatic view showing a device for forming a thin carbon film in a diamond form on the outer clutch plate.

The thin carbon film D in a diamond form is formed by, for example, a forming device 61 shown in FIG. 8. The forming device 61 is for performing high temperature plasma CVD, and includes a forming chamber 63 having an exhaust port 62. A cathode 64 and an anode 65 for electric discharge are placed inside the forming chamber 63. A power supply 66 for applying DC voltage is connected to the cathode 64 and the anode 65. A supply port 67 is formed at a tip end of the anode 65.

Raw material gas for synthesizing the thin carbon film D in a diamond form passes through a space between the cathode 64 and the anode 65, and supplied into the forming chamber 63 from the supply port 67. The raw material gas is decomposed and excited by the electric discharge between the cathode 64 and the anode 65, and generates plasma while passing near the supply port 67. The inside of the forming chamber 63 is at lower pressure than atmospheric pressure during the period of time from generation of the plasma to forming of the thin carbon film D in a diamond form. A holder 68 to set the outer clutch plate 34*b* is placed inside the forming chamber 63.

The plasma is applied to the sliding surface S2 of the outer clutch plate 34*b* set on the holder 68, whereby the thin carbon film D in a diamond form is deposited on a surface of the sliding surface S2 until it has predetermined thickness. In this embodiment, the thickness of the thin carbon film D in a diamond form is 3 $\mu$m.

The thickness of the thin carbon film D in a diamond form is in the range of 0.1 to 10 $\mu$m, preferably in the range of 1 to 5 $\mu$m in order to protect each of the sliding surfaces S2 effectively. With the thickness less than 0.1 $\mu$m, useful life against wear is short, and is not suitable for practical use. On the other hand, if the thickness exceeds 10 $\mu$m, the thin carbon film D in a diamond form becomes brittle. The thin carbon film D in a diamond form is formed by diamond-like carbon (DLC).

As shown in FIG. 1, the armature 35 forming a ring shape is mounted to the inner circumference of the front housing 31*a* by spline fitting, and is movable in the axial direction with respect to the front housing 31*a*. The armature 35 is located at one side of the friction clutch 34, and opposes the friction clutch 34.

The electromagnet 33 forms a magnetic path L1 circulating through the yoke 36, the rear housing 31*b*, the first cam member 37, the armature 35, the friction clutch 34, the rear housing 31*b* and the yoke 36 when electric current is supplied.

As shown in FIG. 1, the cam mechanism 30*e* includes the first cam member 37, a second cam member 38 and a plurality of ball-shaped cam follower 39. The first cam member 37 and the second cam member 38 form substantially a disk shape.

The first cam member 37 is rotatably fitted onto the outer circumference of the inner shaft 30*b*, and is supported rotatably with respect to the rear housing 31*b* via a thrust bearing 41. An inner circumference surface of the armature 35 abuts against an outer circumference surface of the first cam member 37. The first cam member 37 and the armature 35 are relatively rotatable.

Figure 5:
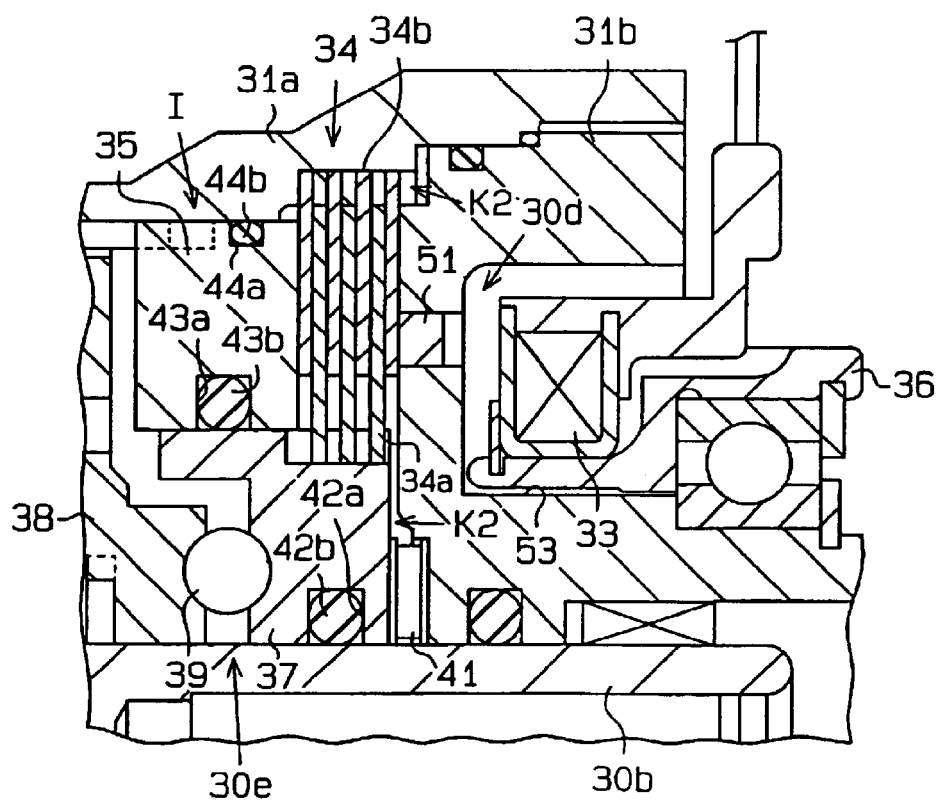
FIG. 5 is a partially enlarged cross-sectional view of the coupling device in FIG. 1.

As shown in FIG. 5, an annular housing groove 42*a* is formed in an inner circumference surface of the first cam member 37. A seal member, or a seal ring 42*b*, contacts the outer circumference surface of the inner shaft 30*b* and is housed inside the housing groove 42*a*. The seal ring 42*b* seals a gap between the inner shaft 30*b* and the first cam member 37.

An annular housing groove 43*a* is formed in the inner circumference surface of the armature 35. A seal member, or seal ring 43*b*, contacts the outer circumference surface of the first cam member 37 and is housed in the housing groove 43*a*. The seal ring 43*b* seals a gap between the first cam member 37 and the armature 35.

An annular housing groove 44*a* is formed in an outer circumference surface of the armature 35. A seal member, or a seal ring 44*b*, contacts the inner circumference surface of the front housing 31*a* is housed in the housing groove 44*a*. The seal ring 44*b* seals a gap between the armature 35 and the front housing 31*a*.

The armature 35, the first cam member 37, and the seal rings 42*b*, 43*b*, and 44*b*, which are seal members, construct a seal mechanism I.

As shown in FIG. 1, a space enclosed by the front housing 31*a*, the armature 35, the first cam member 37 and the inner shaft 30*b* forms a first housing chamber K1. A space enclosed by the inner shaft 30*b*, the first cam member 37, the armature 35, the front housing 31*a* and the rear housing 31*b* forms a second housing chamber K2.

The second cam member 38 is mounted to the outer circumference of the inner shaft 30*b* by spline fitting and is movable in the axial direction with respect to the inner shaft 30*b*, and rotates integrally with the inner shaft 30*b*. The second cam member 38 opposes the main clutch mechanism 30*c*.

The first cam member 37 has a plurality of cam grooves which are placed on the same circle and each placed to be spaced by a predetermined angle, on the surface opposing the second cam member 38. The second cam member 38 similarly has a plurality of cam grooves which are placed on the same circle and each placed to be spaced by a predetermined angle, on the surface opposing the first cam member 37. Each of the cam followers 39 is placed between the cam members 37 and 38, and is held by one of the cam grooves on the first cam member 37 and the corresponding cam groove on the second cam member 38.

Each cam followers 39 allows relative rotation of both the cam members 37 and 38 only within the range of the circumferential length of both of the corresponding cam grooves. Each of the cam followers 39 presses the second cam member 38 in a direction to move away from the first cam member 37, namely, in a direction toward the main clutch mechanism 30*c* by the action of both the corresponding cam grooves following the relative rotation of both the cam members 37 and 38.

The armature 35 and the electromagnet 33 are placed to sandwich the friction clutch 34 and the rear housing 31*b* between them. The rear housing 31*b* functions as a magnet path forming member.

Lubricant oil to lubricate the clutch plates 32*a* and 32*b* is charged in the first housing chamber K1. In the present embodiment, the amount of the lubricant oil inside the first housing chamber K1 is equal to about 80% of the volumetric capacity of the first housing chamber K1. The seal mechanism I prevents the lubricant oil inside the first housing chamber K1 from leaking into the second housing chamber K2. While the first housing chamber K1 is the charging space for the lubricant oil, the second housing chamber K2 is the uncharged space for the lubricant oil. Thrust bearing 41 located inside the second housing chamber K2 is lubricated with grease.

When an electric current is not supplied to the electromagnet 33 of the pilot clutch mechanism 30*d*, an electromagnetic attraction force does not occur between the electromagnet 33 and the armature 35. As a result, the friction clutch 34 is not held by the rear housing 31*b* and the armature 35, and the adjacent inner clutch plate 34*a* and outer clutch plate 34*b* are in the state in which they are released from the friction engagement (non-engaging state of the friction clutch 34). In this state, the friction clutch 34 does not transmit torque to the first cam member 37 from the front housing 31*a*, and the cam mechanism 30*e* does not function to press the second cam member 38 in the direction to the main clutch mechanism 30*c*. As a result, the main clutch mechanism 30*c* is in a non-engaging state in which the torque transmission to the inner shaft 30*b* from the front housing 31a is shut off, and the power of the engine 14 is not transmitted to both the rear wheels 16. Accordingly, the four-wheel drive vehicle 12 is driven in a two-wheel drive mode in which only both the front wheels 15 are driven by the engine 14.

Meanwhile, when an electric current is supplied to the electromagnet 33, the electromagnetic attraction force occurs between the electromagnet 33 and the armature 35. Consequently, the friction clutch 34 is held by the rear housing 31b and the armature 35, and both the adjacent clutch plates 34a and 34b are engaged by friction with each other (the engaging state of the friction clutch 34). In this state, the friction clutch 34 allows torque transmission to the first cam member 37 from the front housing 31a, and the first cam member 37 rotates with the front housing 31a. Thereupon, relative rotation occurs between the first cam member 37 and the second cam member 38, and the cam mechanism 30e functions to press the second cam member 38 in the direction toward the main clutch mechanism 30c.

As a result, both the adjacent clutch plates 32a and 32b are engaged with each other by friction and the main clutch mechanism 30c is in the engaging state which allows the torque transmission from the front housing 31a to the inner shaft 30b. Accordingly, the power of the engine 14 is transmitted to both the rear wheels 16 and the four-wheel drive vehicle 12 is driven in a four-wheel drive mode.

The torque transmission rate from the front housing 31a to the inner shaft 30b is determined according to the electromagnetic attraction force occurring between the electromagnet 33 and the armature 35, in other words, the frictional force between both the adjacent clutch plates 34a and 34b in the friction clutch 34. The electromagnetic attraction force can be adjusted by controlling the applied current to the electromagnet 33.

By increasing the applied current to the electromagnet 33 to a predetermined value, the electromagnetic attraction force occurring between the electromagnet 33 and the armature 35 increases to the extent which does not allow the friction clutch 34 to slide. As a result, the cam mechanism 30e increases the force to press the second cam member 38 in the direction to move to the main clutch mechanism 30c, so that slide does not occur to the main clutch mechanism 30c. Accordingly, the outer case 30a and the inner shaft 30b are integrally rotated, and the torque transmission rate from the outer case 30a to the inner shaft 30b becomes 100%. Consequently, the power of the engine 14 is equally transmitted to the front wheels 15 and the rear wheels 16.

Next, the characteristics of the coupling device 11 of this embodiment will be explained comparing it with a conventional coupling device. As the conventional device, the following device is prepared. Namely, the conventional device does not include the seal rings 42b, 43b and 44b which are included in the device 11 of this embodiment. Therefore, in the conventional device, the gap between the first housing chamber K1 and the second housing chamber K2 is not sealed, and lubricant oil is movable between both the housing chambers K1 and K2. Further, in the conventional device, the lubricant oil of the amount corresponding to 80% of the total volumetric capacity of both the housing chambers K1 and K2 is charged in both the housing chambers K1 and K2. Accordingly, the friction clutch of the conventional device is exposed to the lubricant oil. In addition, in the conventional device, the thin carbon film D in a diamond form is not applied to each of the outer clutch plates in the friction clutch, and instead, nitride treatment or quenching and tempering treatment is applied thereto. The torque transmission ability of the conventional device is assumed to be the same as that of the device 11 of this embodiment.

Figure 6:
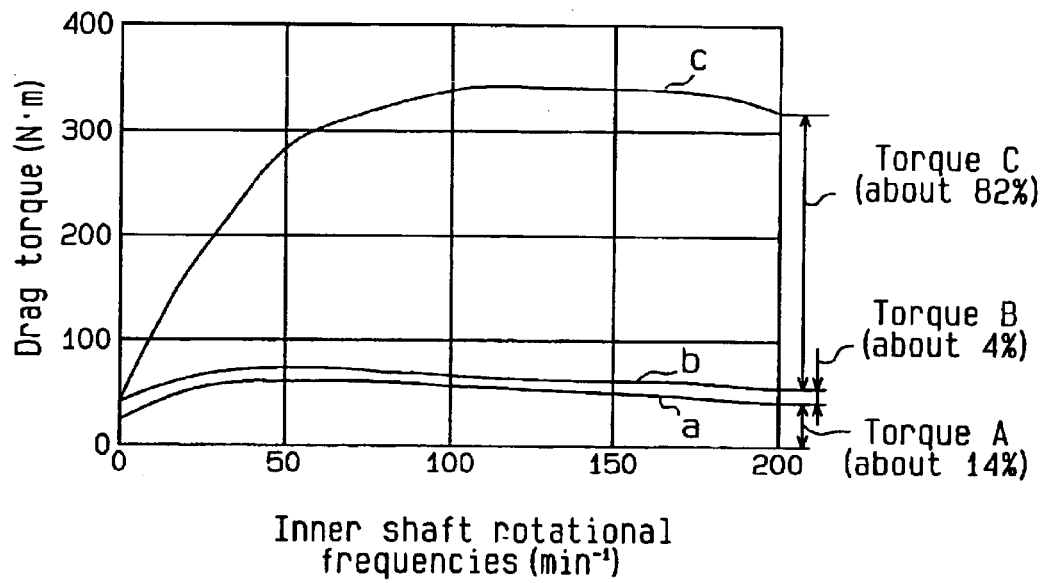
FIG. 6 is a graph showing relationship between rotational frequency of an inner shaft and drag torque in a prior art coupling device.

FIG. 6 is a graph showing relationship between the rotational frequency of the inner shaft (corresponding to the inner shaft 30b of this embodiment) and the drag torque in the conventional device. The graph in FIG. 6 is the experimental result which is obtained by rotating the inner shaft in the state in which the outer case (corresponding to the outer case 30a in this embodiment) is fixed in the environment at minus 20 degrees centigrade.

This graph shows the result of measuring the drag torque which is transmitted from the inner shaft to the outer case by the influence of the viscosity of the lubricant oil and the residual magnetism of the electromagnet in the state in which the electromagnet (corresponding to the electromagnet 33 in this embodiment) is not energized.

The line a in the graph represents the drag torque occurring as a result that the viscosity of the lubricant oil having influence on the main clutch mechanism (corresponding to the main clutch mechanism 30c in this embodiment).

The line b in the graph represents the sum of the drag torque shown by the line a, and the drag torque occurring as a result that the residual magnetism of the electromagnet has the influence on the friction clutch (corresponding to the friction clutch 34 in this embodiment).

The line c in the graph represents the sum of the drag torque shown by the line b, and the drag torque occurring as a result that the viscosity of the lubricant oil has the influence on the friction clutch.

Accordingly, in FIG. 6, when the rotational frequency of the inner shaft is 200 min$^{-1}$, in other words, 200 rpm, about 14% of the drag torque is caused by the viscosity of the lubricant oil exerted on the main clutch mechanism, about 4% of the drag torque is caused by the residual magnetism of the electromagnet exerted on the friction clutch, and about 82% of the drag torque is caused by the viscosity of the lubricant oil exerted on the friction clutch. Hereinafter, the drag torque, which is caused by the viscosity of the lubricant oil exerted on the main clutch mechanism, will be referred to as torque A, the drag torque, which is caused by the residual magnetism of the electromagnet exerted on the friction clutch, will be called torque B, and the drag torque, which is caused by the viscosity of the lubricant oil exerted on the friction clutch will be called torque C.

The torque C is larger as compared with the torque A and the torque B. The reason why the torque C is the largest is that the influence of the viscosity of the lubricant oil exerted on the friction clutch has on the main clutch mechanism after it is amplified by the cam mechanism (corresponding to the cam mechanism 30e of this embodiment).

Figure 7:
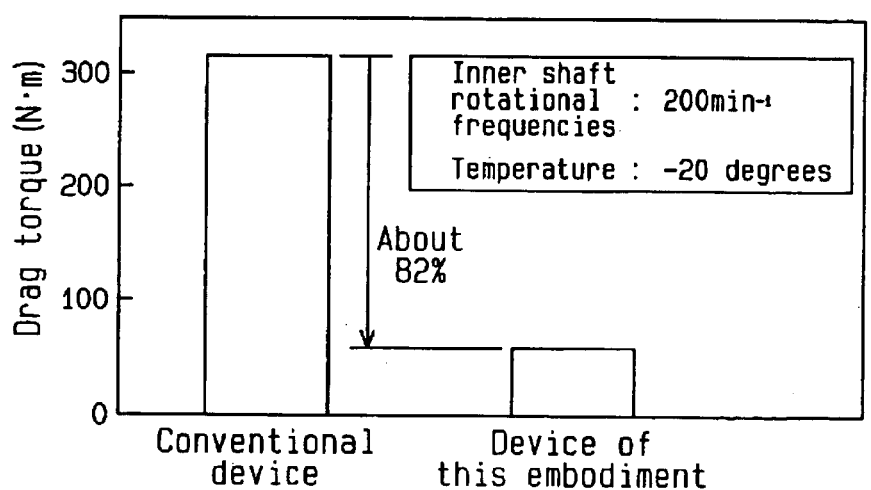
FIG. 7 is a graph showing the drag torque in the prior art coupling device and drag torque in the coupling device in FIG. 1.

On the other hand, in the device 11 of this embodiment, the lubricant oil does not exist in the second housing chamber K2 in which the friction clutch 34 is housed, thus exerting no influence of the viscosity of the lubricant oil on the friction clutch 34, and therefore the torque C does not occur. Accordingly, as shown in FIG. 7, when the rotational frequency of the inner shaft is 200 min$^{-1}$ in the environment at −20 degrees centigrade, the drag torque is reduced by about 82% in the device 11 of this embodiment as compared with the conventional device.

In the friction clutch of the conventional device, the nitride treatment or the quenching and tempering treatment is applied to the outer clutch plates and the inner clutch plates. Consequently, when the outer clutch plates and the inner clutch plates are engaged by friction in the state without lubricant oil, vigorous wearing occurs. However, in the friction clutch 34 of this embodiment, the thin carbon film D in the diamond form is applied to the sliding surfaces S2 of the outer clutch plates 34b, and therefore the sliding surfaces S2 are resistant to wear. The thin carbon film D in the diamond form also functions as a solid lubricant, and therefore the sliding surfaces S1 of the inner clutch plates 34a in sliding contact with the sliding surfaces S2 hardly wear. Accordingly, the friction clutch 34 of this embodiment is excellent in durability.

In the conventional device, worn particles occurring in the friction clutch mix into the lubricant oil. On the other hand, in the device 11 of this embodiment, the lubricant oil does not exist in the second housing chamber K2 housing the friction clutch 34, and the second housing chamber K2 is sealed from the first housing chamber K1 in which the lubricant oil exists. Consequently, the worn particles occurring in the friction clutch 34 do not mix into the lubricant oil in the first housing chamber K1.

Accordingly, the device 11 of this embodiment, in which the drag torque is decreased dramatically, is excellent in useful life, as compared with the conventional device.

Since the viscosity of the lubricant oil increases especially at a low temperature, the drag torque caused by the viscosity of the lubricant oil is increased. In the device 11 of this embodiment, in which the friction clutch 34 is not exposed to the lubricant oil, the influence of the drag torque caused by the temperature of the environment is eliminated as much as possible.

Prevention of leakage of the lubricant oil from the first housing chamber K1 to the second housing chamber K2 is realized by the simple construction in which the seal rings 42b, 43b and 44b are provided.

The annular grooves 40 provided in both the sliding surfaces S1 of each of the inner clutch plates 34a make it easy to adjust the contact area between the inner clutch plate 34a and the outer clutch plate 34b to be an optional value.

A second embodiment of the present invention will be explained below with reference to FIG. 9 to FIG. 12 with particular emphasis on a difference from the first embodiment in FIG. 1 to FIG. 8. In the second embodiment, the same components as in the first embodiment shown in FIG. 1 to FIG. 8 are given the reference numerals with 100 being added to the reference numerals given the corresponding components of the first embodiment.

In the device 11 shown in FIG. 1, the first housing chamber K1 in which the lubricant oil exists is sealed from the second housing chamber K2 in which the lubricant oil does not exist. The main clutch mechanism 30c is housed in the first housing chamber K1 and the friction clutch 34 is housed in the second housing chamber K2.

Figure 9:
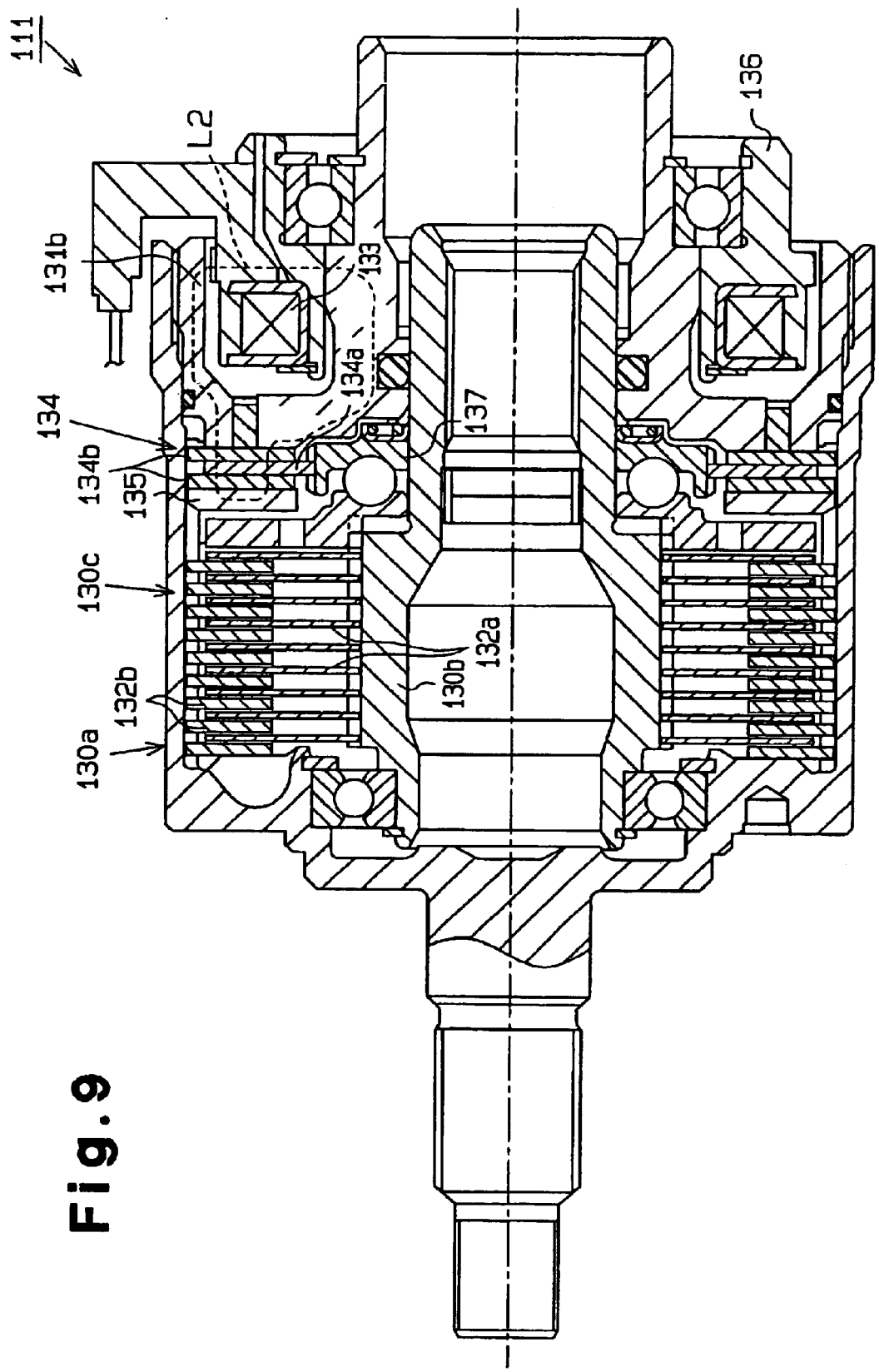
FIG. 9 is a cross-sectional view showing a coupling device according to a second embodiment of the present invention.

On the other hand, in this embodiment, as shown in FIG. 9, a main clutch mechanism 130c and a friction clutch 134 are both exposed to the lubricant oil. Namely, in a device 111 of this embodiment, the housing grooves 42a, 43a and 44a and the seal rings 42b, 43b and 44b included in the device 11 in FIG. 1 are omitted, and the first housing chamber K1 and the second housing chamber K2 which are separated from each other do not exist.

An outer circumference surface of a first cam member 137 is a little separated from an inner circumference surface of an armature 135. The lubricant oil is charged in a single housing chamber enclosed by an outer case 130a, an inner shaft 130b, and a rear housing 131b. The lubricant oil lubricates inner and outer clutch plates 132a and 132b of the main clutch mechanism 130c, and an inner clutch plate 134a and outer clutch plates 134b of the friction clutch 134.

The friction clutch 134 includes one iron inner clutch plate 134a and two iron outer clutch plates 134b which are placed at both sides of the inner clutch plate 134a.

When an electric current is supplied to the electromagnetic coil, an electromagnet 133 forms a magnetic path L2 circulating through a yoke 136, a rear housing 131b, the friction clutch 134, an armature 135, the friction clutch 134, the rear housing 131b and the yoke 136.

Figure 10:
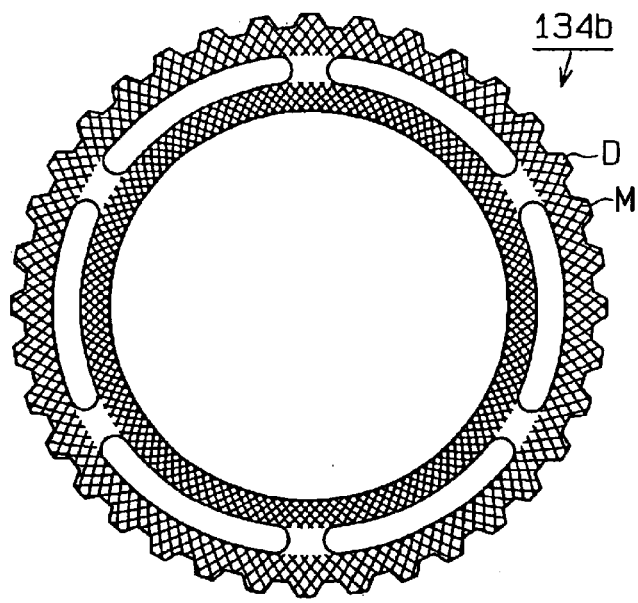
FIG. 10 is a front view showing the outer clutch plate included in the coupling device in FIG. 9.
Figure 11:
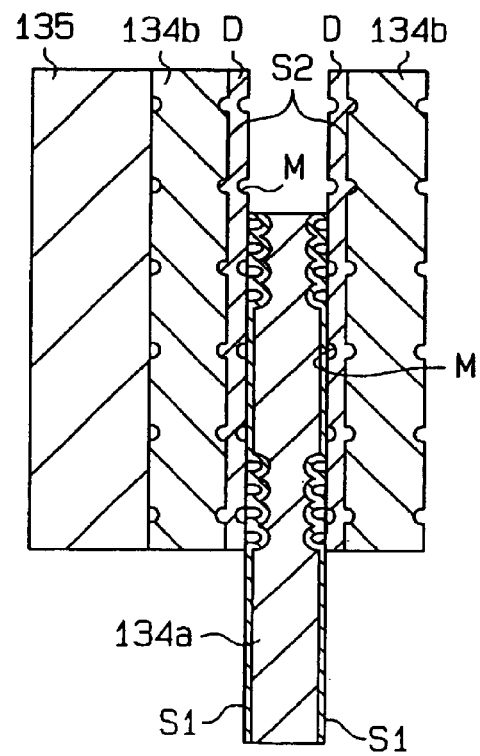
FIG. 11 is a cross-sectional view showing the inner clutch plate and the outer clutch plate included in the coupling device in FIG. 9.

As shown in FIG. 10 and FIG. 11, a number of grooves M in a substantially net form are formed by press working on both the sliding surfaces S2 of the each outer clutch plate 134b. The grooves M receive excessive lubricant oil existing between the inner clutch plate 134a and each of the outer clutch plates 134b opposing it. Both the sliding surfaces S1 of the inner clutch plate 134a have surface roughness (Rz) of about 13.5 $\mu$m, and the sliding surface S2 of the each outer clutch plate 134b has the surface roughness (Rz) of about 3.3 $\mu$m. Rz means ten point height irregularities (ten points average height).

The nitride treatment, or quenching and tempering treatment is applied to the each sliding surface S1.

As shown in FIG. 11, the thin carbon film D in the diamond form is applied to the each sliding surface S2 by a known method such as the CVD (Chemical Vapor Deposition) method, the PVD (Physical Vapor Deposition) method, or the ion vapor deposition method. The thickness of the thin carbon film D in the diamond form is 3 $\mu$m, and the surface roughness (Rz) of the thin carbon film D in the diamond form is about 3.3 $\mu$m.

Next, the characteristics of the coupling device 111 of this embodiment will be explained with comparison with a conventional coupling device. As the conventional device, the following device is prepared. Namely, the conventional device differs from the device 111 of this embodiment in the point that the nitride treatment is applied to both the outer clutch plates in the friction clutch in the conventional device instead of the thin carbon film D in the diamond form is applied thereto. In the friction clutch of this conventional device, the surface roughness (Rz) of the both the sliding surfaces of the inner clutch plate is about 7.8 $\mu$m, and the surface roughness (Rz) of the sliding surface of each outer clutch plate is about 3.8 $\mu$m. The torque transmission ability of the conventional device is assumed to be the same as the device 111 of this embodiment.

Figure 12:
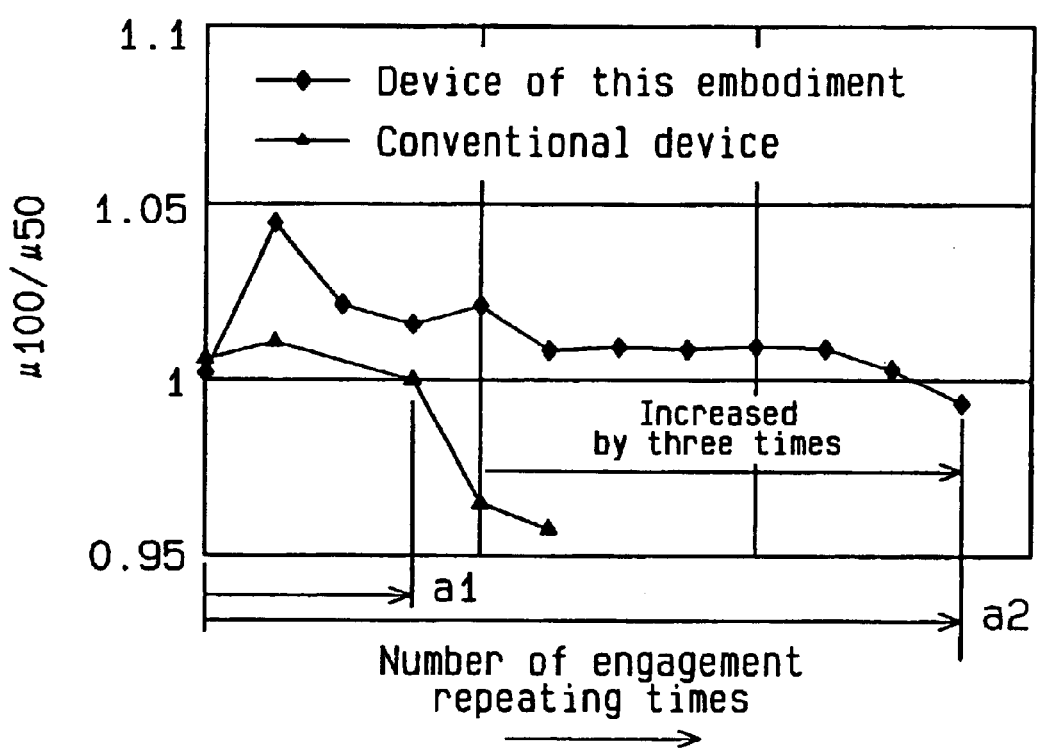
FIG. 12 is a graph showing relationship between the number of engagement repeating times and $\mu 100/\mu 50$ in the second embodiment.

FIG. 12 is a graph showing the relationships between the number of engagement repeating times and $\mu 100/\mu 50$ for the device 111 of this embodiment and the conventional device. In the graph in FIG. 12, $\mu 100/\mu 50$ is plotted in the vertical axis, and the number of engagement repeating times is plotted in the horizontal axis. The number of engagement repeating times is the numerical value which is counted each time the adjacent clutch plates in the friction clutch are engaged with each other once.

$\mu 100/\mu 50$ shows the value obtained by dividing the friction coefficient $\mu$, which is obtained when the inner shaft is rotated at the rotational frequency v of 100 $\text{min}^{-1}$ (rpm), by the friction coefficient $\mu$, which is obtained when the same inner shaft is rotated at the rotational frequency v of 50 $\text{min}^{-1}$ (rpm) in the state where the outer case is fixed.

The fact that the value of $\mu 100/\mu 50$ is 1 or more means that the larger the rotational frequency v, the larger the friction coefficient $\mu$. This is called that the $\mu$-v property has positive dependence on rotation speed, or positive gradient. When the $\mu$-v property is a positive gradient, it is generally known that judder is favorably prevented.

Judder means the phenomena in which, for example, self-excited vibrations caused by the stick slip at the sliding portions between the inner clutch plate 134a and the outer clutch plate 134b, or the sliding portions between the inner clutch plate 132a and the outer clutch plate 132b influence the entire vehicle loaded with the coupling device 111.

In order to reduce the stick slip, it is effective that the dependence of the friction coefficient $\mu$ with respect to the relative rotational frequency v between both the adjacent clutch plates, namely, the $\mu$-v property is a positive gradient. When the $\mu$-v property is a positive gradient, $d\mu/dv$ is 0 or more.

The frictional force occurring between both the adjacent clutch plates is constituted by the sum of the a fluid friction force (shearing resistance force of the oil film) and the boundary friction force (frictional force caused by contact of both the clutch plates), and the magnitude of the friction forces per unit area is in the relationship of the fluid friction force << the boundary friction force. If the relative rotational frequency v becomes larger, the formation of the oil film is promoted, and the fluid friction force increases while the boundary friction force decreases. If the roughness of the contact surface of both the clutch plates is large, the contact of the raised portions of both the contact surfaces is maintained even if the relative rotational frequency v increases. In this case, the decrease in the boundary friction force is suppressed, the increase in the fluid friction force is suppressed, and the $\mu$-v property tends to be a positive gradient.

Namely, as the surface roughness of each of the clutch plates 132a, 132b, 134a, and 134b reduces, stick slip occurs more easily. As the amount of mixture of the worn particles, which occur from these clutch plates 132a, 132b, 134a, and 134b, into the lubricant oil increases, stick slip occurs more easily.

As shown in the graph in FIG. 12, in the conventional device, when the number of engagement repeating time exceeds a1, the value of $\mu100/\mu50$ becomes smaller than 1, and judder occurs. The judder is caused by wear of the clutch plate in the friction clutch. Occurrence of judder means that the device is at the end of its life.

On the other hand, in the device 111 of this embodiment, when the number of engagement repeating times exceeds a2, the value of $\mu100/\mu50$ is smaller than 1, and judder occurs. At this time, the device 111 is at the end of life.

As known from the graph in the above-described FIG. 12, in the device 111 of this embodiment including the outer clutch plates 134b to which the thin carbon film D in the diamond form is applied, the number of engagement repeating times until judder occurs increases by three times or more as compared with the conventional device. Namely, the outer clutch plates 134b of this embodiment wears less as compared with the conventional outer clutch plates. The inner clutch plate 134a of this embodiment, which slides in contact with the thin carbon film D in the diamond form, wears less as compared with the conventional inner clutch plate which does not slide in contact with the thin carbon film D in the diamond form. This is because the thin carbon film D in the diamond form functions as the solid lubricant which suppress wear of the inner clutch plate 134a.

Accordingly, in this embodiment, the life of the clutch plates 134a and 134b is dramatically increased, and by extension, the life of the coupling device 111 can be dramatically increased.

The grooves M in substantially the net form, which are provided on the sliding surface S2 of each of the outer clutch plates 134b make it easy to adjust the contact area between the inner clutch plate 134a and the outer clutch plate 134b to be an optional value. The grooves M receive excessive lubricant oil existing between the adjacent clutch plates 134a and 134b to suppress the formation of an oil film. As a result, the sliding property of the clutch plates 134a and 134b is improved, and reduction of the drag torque and improvement in durability of the friction clutch 134 are realized.

It should be apparent to those skilled in the art that the present invention may be embodied in many other specific forms without departing from the spirit or scope of the invention. Particularly, it should be understood that the invention may be embodied in the following forms.

In the coupling device 11 of the first embodiment, the amount of lubricant oil inside the first housing chamber K1 is 80% of the volumetric capacity of the first housing chamber K1, but any amount may be charged if only the amount is suitable for lubrication of the main clutch mechanism 30c.

The outer clutch plates 34b and 134b in the first and second embodiments, to which the thin carbon film D in the diamond form is applied, may be adopted in the clutch mechanism such as an automatic transmission clutch mechanism.

In the second embodiment, the grooves M in substantially the net form are formed on each outer clutch plate 134b, but the grooves M may be omitted.

The same grooves as the grooves M in the second embodiment may be provided on the outer clutch plates 34b in the first embodiment.

In the first and second embodiments, the annular grooves 40 are provided on the inner clutch plates 34a and 134a, but these annular grooves 40 may be omitted.

In the first embodiment, the outer clutch plates 34b to which the thin carbon film D in the diamond form is applied are adopted in the friction clutch 34. However, without being limited to this, the thin carbon film D in the diamond form may be applied to at least one of the clutch plates 32a and 32b in the main clutch mechanism 30c. Such change may be embodied in the coupling device 111 of the second embodiment.

In the first and second embodiments, the thin carbon film D in the diamond form is applied to the outer clutch plates 34b and 134b, but without being limited to this, the thin carbon film D in the diamond form may be applied to the inner clutch plates 34a and 134a.

In the first and second embodiments, the thin carbon film D in the diamond form is applied to the outer clutch plates 34b and 134b, and the nitride treatment, or the quenching and tempering treatment is applied to the inner clutch plates 34a and 134a. However, without being limited to this, the nitride treatment, or the quenching and tempering treatment may be applied to the outer clutch plates 34b and 134b, and the thin carbon film D in the diamond form may be applied to the inner clutch plates 34a and 134a.

In the first and second embodiments, the nitride treatment, or the quenching and tempering treatment is applied to the inner clutch plates 34a and 134a, but such treatment need not be applied thereto.

Therefore, the present examples and embodiments are to be considered as illustrative and not restrictive and the invention is not to be limited to the details given herein, but may be modified within the scope and equivalence of the appended claims.

What is claimed is:

1. A coupling device comprising:

a first rotary member;

a second rotary member, which is rotatable relative to the first rotary member;

a plurality of housing chambers defined between the first rotary member and the second rotary member, wherein the housing chambers include a first housing chamber, which is charged with lubricant oil, and a second housing chamber, which is not charged with lubricant oil, and wherein the second housing chamber is sealed from the first housing chamber;

a first clutch housed in the second housing chamber, wherein the first clutch includes a first iron clutch plate and a second iron clutch plate, which friction-engage with each other, wherein the first clutch plate has a first sliding surface that contacts the second clutch plate, wherein the second clutch plate has a second sliding surface that contacts the first clutch plate, and wherein a thin carbon film in a diamond form is formed on at least one of the first and second sliding surfaces;

a second clutch housed in the first housing chamber, wherein the first and second clutches cooperate to transmit torque between the first rotary member and the second rotary member; and an electromagnetic actuator, which actuates the first clutch such that the clutch plates friction-engage with each other.

2. The coupling device according to claim 1, wherein the second clutch is located between the rotary members, torque being transmitted between the rotary members through the second clutch, wherein, when the electromagnetic actuator actuates the first clutch, the second clutch is actuated to transmit torque between the rotary members in accordance with motion of the first clutch.

3. The coupling device according to claim 1, wherein the second clutch is a main clutch located between the rotary members, torque being transmitted between the rotary members through the main clutch, wherein the first clutch and the electromagnetic actuator form a pilot clutch mechanism, wherein the coupling device further includes a cam mechanism located between the pilot clutch mechanism and the main clutch, and wherein the cam mechanism actuates the main clutch in response to motion of the pilot clutch mechanism.

4. The coupling device according to claim 3, wherein the electromagnetic actuator includes an armature and an electromagnet for actuating the armature, wherein the armature and the cam mechanism function as a seal mechanism for sealing the second housing chamber from the first housing chamber.

5. The coupling device according to claim 4, wherein the sealing mechanism includes seal members, each of which is attached to one of the armature and the cam mechanism.

6. The coupling device according to claim 1, wherein the thin carbon film is formed on the first sliding surface, and wherein nitride treatment or quenching and tempering treatment is applied to the second sliding surface.

7. The coupling device according to claim 1, wherein the thin carbon film is formed on the first and second sliding surfaces.

8. The coupling device according to claim 1, wherein at least one of the first and second sliding surfaces includes a plurality of grooves that extend about the rotation axis of the associated clutch plate.

9. The coupling device according to claim 1, wherein at least one of the first and second sliding surfaces includes grooves in a substantially net form.

10. A friction clutch comprising:

a first clutch plate having a first sliding surface; and a second clutch plate having a second sliding surface that contacts the first sliding surface, wherein the clutch plates friction-engage with each other to transmit torque, and wherein a thin carbon film in a diamond form is formed on at least one of the first and second sliding surfaces, wherein the thin carbon film is formed on the first and second sliding surfaces.

11. A coupling device comprising:

a first rotary member;

a second rotary member, which is rotatable relative to the first rotary member;

a housing chamber defined between the first rotary member and the second rotary member, wherein the housing chamber is charged with lubricant oil; and a plurality of clutches located in the housing chamber, wherein the clutches cooperate to transmit torque between the first rotary member and the second rotary member, wherein at least one of the clutches is a friction clutch having a first iron clutch plate and a second clutch plate, wherein the clutch plates friction-engage with each other, wherein the first clutch plate has a first sliding surface that contacts the second clutch plate, wherein the second clutch plate has a second sliding surface that contacts the first clutch plate, and wherein a thin carbon film in a diamond form is formed on at least one of the first and second sliding surfaces, wherein the thin carbon film is formed on the first and second sliding surfaces.

* * * * *